United States Patent [19]

Fenton

[11] 4,276,076
[45] Jun. 30, 1981

[54] TRANSFER MEANS OF GLASSWARE FORMING MACHINES

[75] Inventor: Frank A. Fenton, Doncaster, England

[73] Assignee: Emhart Industries, Inc., Farmington, Conn.

[21] Appl. No.: 38,372

[22] Filed: May 11, 1979

[30] Foreign Application Priority Data

May 24, 1978 [GB] United Kingdom ............... 21916/78

[51] Int. Cl.³ .............................................. C03B 9/44
[52] U.S. Cl. ...................................... 65/241; 65/229; 65/323
[58] Field of Search .................. 65/229, 230, 241, 323

[56] References Cited

U.S. PATENT DOCUMENTS

| | | | |
|---|---|---|---|
| 1,911,119 | 5/1933 | Ingle | 65/360 X |
| 2,075,363 | 3/1937 | Smith | 65/230 |
| 3,759,686 | 9/1973 | Trahan | 65/323 |
| 3,914,120 | 10/1975 | Foster | 65/229 |
| 4,140,468 | 2/1979 | Duga | 425/534 |
| 4,197,073 | 4/1980 | Rees et al. | 425/163 |

FOREIGN PATENT DOCUMENTS 1491859  11/1977  United Kingdom .

Primary Examiner—Arthur D. Kellogg
Attorney, Agent, or Firm—H. Samuel Kieser

[57] ABSTRACT

A multi-gob glassware forming machine has a blank station at which parisons are formed from gobs of molten glass in a plurality of blank moulds, an intermediate station at which the parisons are supported after having been transferred from the blank station, and a blow station at which the parisons are blown in blow moulds to the shape of the articles of glassware. The spacing of the supported parisons at the intermediate station is smaller than the spacing of the centers of the blow moulds at the blow station and the machine has transfer means which increase the spacing of the parisons during transfer of the latter from the intermediate station to the blow station.

6 Claims, 3 Drawing Figures

TRANSFER MEANS OF GLASSWARE FORMING MACHINES

BACKGROUND OF THE INVENTION

This invention relates to transfer means of glassware forming machines.

My co-pending patent application Ser. No. 024,647 filed Mar. 28, 1979 discloses means by which a conventional Hartford I.S. glassware forming machine (such as disclosed in U.S. Pat. No. 1,911,119) can be modified by converting the blow station of the I.S machine to an intermediate station (at which parisons may be reheated) and adding a blow station. In consequence, the two-station I.S. machine is converted into a three-station machine. The maximum diameter (or equivalent lateral dimension in the case of non-cylindrical glassware) which such a converted multi-gob machine can produce is determined by the spacing of the blank moulds at the blank station, this spacing being equal to the spacing between the centres of the parisons at the intermediate station and between the centres of the blow moulds at the blow station. The present invention was devised to enable such a converted machine to be capable of producing glassware of a larger lateral dimension without altering the spacing of the blank moulds or the spacing of the supporting parisons at the intermediate station. The invention is, however, applicable to other types of glassware forming machine having three stations, for example the machine disclosed in British Patent Specification No. 1,491,859.

SUMMARY OF THE INVENTION

According to the invention a multi-gob glassware forming machine has a blank station at which parisons are formed from gobs of molten glass in a plurality of blank moulds, an intermediate station at which the parisons are supported after having been transferred from the blank station, and a blow station at which the parisons are blown in blow moulds to the shape of the articles of glassware, the spacing of the supported parisons at the intermediate station being smaller than the spacing of the centres of the blow moulds at the blow station and the machine having transfer means which increase the spacing of the parisons during transfer of the latter from the intermediate station to the blow station.

By making the spacing of the centres of the blow moulds larger than the spacing between the centres of the supported parisons at the intermediate station, and by providing transfer means for effecting a corresponding increase in the spacing of the parisons during transfer from the intermediate station to the blow station, the machine can produce larger diameter glassware, thus increasing the range of size of glassware which the machine can produce. The invention thus takes advantage of the fact that the parisons are slimmer than the finally blown articles of glassware and that the maximum size of glassware producable by the machine can be increased by accommodating larger blow moulds without increasing the centre spacing at the blank or intermediate station.

The transfer means may comprise supports for detachably engaging the parisons, the supports being mounted for reciprocatory straight-line motion between the intermediate and blow stations. The supports may be linked by a mechanism which provides lost motion in order to increase the spacing between the supports during transfer from the intermediate to the blow station and decreases the spacing between the supports during return movement of the supports from the blow station to the intermediate station.

The lost motion mechanism may comprise a rod to which one of the supports is secured and on which another of the supports is slidable, and stop means which limit movement of said one support in order to define the position of said one support at the blow station but which allow continued movement of the other of the supports until said other support reaches its final position at the blow station. Each support may comprise movable jaws for engaging the corresponding parison and a piston and cylinder device operative to close the jaws at the intermediate station to engage the parison and to open the jaws at the blow station to release the parison.

The transfer means may include drive means including an arm which is secured to the rod and which in use is driven in an oscillatory motion to transfer the parisons from the intermediate station to the blow station in timed relationship with the operation of the remainder of the machine.

BRIEF DESCRIPTION OF THE DRAWINGS

Transfer means of a three-station double-gob glassware forming machine according to the invention will now be described, by way of example, with reference to the accompanying diagrammatic drawings, in which.

DESCRIPTION OF THE PREFERRED EMBODIMENT

Figure 1:
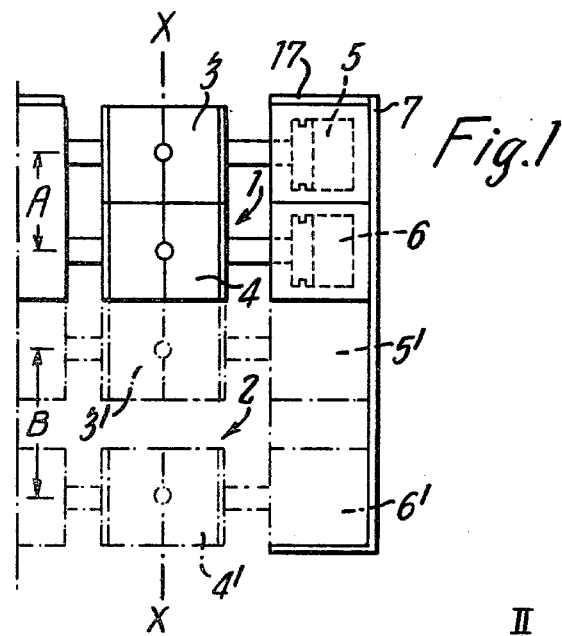
FIG. 1 is a plan view of the transfer means.

The machine to which the transfer means is fitted is similar to the machine in FIG. 1 of co-pending patent application Ser. No. 024,647 filed Mar. 28, 1979 in that it comprises a blank station having two parisons moulds in which parisons are formed in an inverted position, means which transfer the parisons from the blank station to an intermediate station and invert the parisons during this transfer so that they are upright on reaching the intermediate station, and a blow station having two blow moulds in which the parisons are blown into the final shape of the articles of glassware.

In FIG. 1, the blank station is not shown: the intermediate station is indicated at 1 and the blow station at 2. At the intermediate station 1 each parison is supported by a corresponding pair of support jaws 3, 4 which engage the parison below the finish thereof. The jaws 3, 4 are connected to respective pneumatic piston and cylinder devices 5, 6 which are slidable independently in a common slideway 7 which extends, along the centre line X—X of the machine, between the stations 1 and 2.

Figure 2:
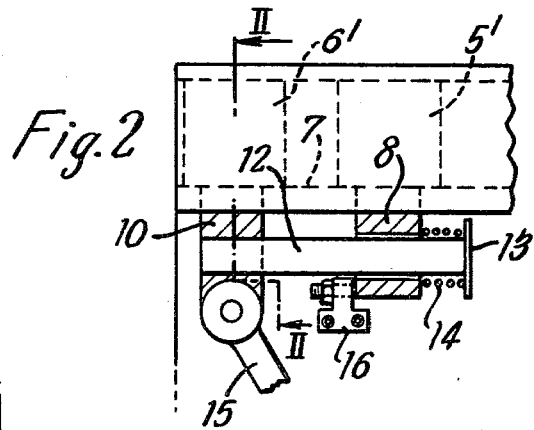
FIG. 2 is a side view of the transfer means, but with parts in a different operative position from that shown in FIG. 1.
Figure 3:
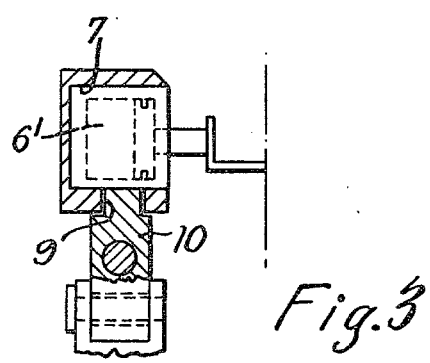
FIG. 3 is a sectional view of the transfer means, taken on the line II—II of FIG. 2.

The device 5 is attached to a block 8 (FIG. 2) which projects through an elongated slot 9 (FIG. 3) formed in the base of the slideway 7; the device 6 is attached to a similar block 10 which also projects downwardly through the slot 9. The block 8 is slidable on a rod 12 which extends horizontally beneath the slideway 7 and to one end of which the block 10 is rigidly secured. The other end of the rod 12 carries a circular end plate 13 forming an abutment for one end of a helical compression spring 14 the other end of which bears against the adjacent face of the block 8. The block 10 provides a pivotal connection for the upper end of a drive arm 15 which is driven with an oscillatory motion about a horizontal pivot axis. Beneath the rod 12 an adjustable stop 16 is secured to the frame of the machine so as to limit movement of the block 8 towards the blow station 2, i.e. towards the left as viewed in FIG. 2.

At the blank station the centres of the blank moulds are spaced at $4\frac{1}{4}$ in. At the intermediate station 1, the centres of the two pairs of jaws 3 and 4 are also spaced at $4\frac{1}{4}$ in., this spacing being indicated by A in FIG. 1. Hence the parisons are supported at the intermediate station at a spacing of $4\frac{1}{4}$ in. By recourse to the invention, the centres of the blow moulds at the blow station 2 are spaced by a distance B equal to $5\frac{1}{2}$ in. so that the machine can accommodate larger blow moulds than would be possible at a spacing of $4\frac{1}{4}$ in. with the result that glassware of larger diameter can be produced. The transfer means increase the spacing between the two parisons as each pair is transferred from the intermediate station 1 to the blow station 2, in the following manner.

When the jaws 3, 4 are at the intermediate station 1 (full lines in FIG. 1) the cylinders of the two devices 5 and 6 are in abutting relationship within the slideway 7, and one end face of the cylinder device 5 abuts an end stop 17 formed by the end of the slideway 7. In this position the pairs of jaws 3 and 4 are spaced $4\frac{1}{4}$ in. apart in order to support the two parisons for re-heating, and the arm 15 occupies a position displaced clockwise from the position illustrated in FIG. 2. At the end of re-heating of the parisons, the arm 15 is pivoted anti-clockwise as viewed in FIG. 2, taking with it the device 6 and the jaws 4 connected thereto. Movement of the block 10 towards the blow station allows the block 8 to undergo follow-up movement towards the blow station, under the influence of the expanding spring 14, until the block 8 engages the adjustable stop 16 which is positioned to arrest movement of the block 8 at a position such that the corresponding pair of jaws 3 is aligned with the centre line of the corresponding blow mould. At this stage in the transfer, the jaws 3 occupy the position indicated at 3' in FIG. 1 and the device 5 occupies the position indicated at 5' in FIGS. 1 and 2.

After the block 8 has ceased to move, the block 10 continues its movement until pivotal movement of the arm 15 ceases when the jaws 4 are aligned with the centre line of the corresponding blow mould. The jaws 4 now occupy the position indicated at 4' in FIG. 1 and the device 6 occupies the position indicated at 6' in FIGS. 1 and 2. It will be appreciated that the pairs of jaws 3, 4 are now at the wider spacing of $5\frac{1}{2}$ in. to suit the wider spacing of the blow moulds at the blow station 2. On return movement of the arm 15, the block 10 takes up the lost motion of $1\frac{1}{4}$ in. before engaging the block 8, after which both blocks 8 and 10 move together to their respective positions at the intermediate station 1.

Thus, the invention enables the ware range of a $4\frac{1}{4}$ in. machine to be increased to that of a $5\frac{1}{2}$ in. machine.

In a practical machine, the drive arm 15 is preferably one of two such spaced arms which conveniently correspond to the pair of arms designated by the numeral 55 in FIG. 1 of co-pending application Ser. No. 024,647 filed Mar. 28, 1979.

I claim:

1. A multi-gob glassware forming machine having a blank station at which parisons are formed from gobs of molten glass in a plurality of blank molds, an intermediate station at which the parisons are supported after having been transferred from the blank station, and a blow station at which the parisons are blown in blow molds to the shape of the articles of glassware, the blank station, the intermediate station and the blow station being aligned along a horizontal axis of the machine, the spacing of the supported parisons at the intermediate station in the direction of the horizontal axis of the machine being smaller than the spacing of the centers of the blow molds at the blow station in the same direction, transfer means for increasing the spacing of the parisons during transfer of the parisons from the intermediate station to the blow station while the parisons remain in a vertical position, said transfer means being reciprocal in a straight line between the intermediate station and the blow molds.

2. A machine according to claim 1 wherein the transfer means includes supports for detachably engaging the parisons.

3. A machine according to claim 2, wherein the supports are linked by lost motion means for providing lost motion in order to increase the spacing between the supports during transfer from the intermediate station to the blow station and to decrease the spacing between the supports during return movement of the supports from the blow station to the intermediate station.

4. A machine according to claim 3, wherein the lost motion means comprises a rod to which one of the supports is secured and on which another of the supports is slidable, and stop means which limit movement of said another support in order to define the position of said another support at the blow station but which allow continued movement of said one support until said one support reaches its final position at the blow station.

5. A machine according to claim 4, wherein each support comprises movable jaws for engaging the corresponding parison and a piston and cylinder device operative to close the jaws at the intermediate station to engage the parison and to open the jaws at the blow station to release the parisons.

6. A machine according to claim 5, wherein the transfer means include drive means including an arm which is secured to the rod and which in use is driven with an oscillatory motion to transfer the parisons from the intermediate station to the blow station, in timed relationship with the operation of the remainder of the machine.

* * * * *